UNITED STATES PATENT OFFICE.

MARTIN WANNER, OF DENVER, COLORADO.

REFRIGERATING LIQUID.

SPECIFICATION forming part of Letters Patent No. 522,812, dated July 10, 1894.

Application filed March 29, 1893. Renewed May 24, 1894. Serial No. 512,377. (No specimens.)

*To all whom it may concern:*

Be it known that I, MARTIN WANNER, a citizen of the United States, and a resident of Denver, in the county of Arapahoe and State of Colorado, have invented certain new and useful Improvements in Refrigerating Liquids and Processes Thereof, of which the following is a specification.

The object of this invention is to prevent or retard the thickening or congelation of the volatile liquid employed in evaporating refrigerating plants and ice machines, and to regulate the rapidity of evaporation of the volatile liquid used.

The main difficulty encountered in producing cold by the evaporation of volatile liquids, of the classes herein contemplated is their tendency to congelation, and their consequent impaired mobility and conductivity. For instance:—the rapid evaporation of carbon bisulphide ($CS_2$) causes such a reduction of temperature that the conductivity of the ordinarily employed vehicles or conductors, whose office it is to convey the caloric from the objects to be cooled to the evaporating liquid, is entirely inadequate to perform the work rapidly enough to keep the liquid in a fluid condition, because the evaporation, being induced by and proceeding from mechanical means, irrespective of the conducting or conveying capacity of the medium employed, abstracts caloric from the liquid and it congeals. Just as soon as this occurs, the contact between the objects to be cooled and the evaporating liquid becomes imperfect, and the effectiveness of the apparatus is destroyed or at least impaired. To illustrate, assuming the apparatus to be used for the manufacture of artificial ice, one of two methods may be employed; either the evaporating liquid is in direct contact with the vessel holding the water to be frozen, or the evaporation is carried on in pipes or other vessels which are in contact or communication with the vessels of water to be frozen by means of a conducting or conveying medium, preferably fluid or liquid. In either case, the successful working of the apparatus depends upon the intimate contact of the evaporating liquid or its vapors with the sides and bottom of the vessel holding the water to be frozen, or with the partitions or walls inclosing the evaporating liquid, or its vapors as would be the case if the evaporation was carried on in pipes or other vessels. During the process, the volatile liquid having by too rapid evaporation become solid, loses its mobility, and consequently its conductivity, and is unable to closely envelop or touch the vessels holding the water to be frozen, or the conducting medium, as the case may be, and moreover, evaporation practically ceases until the temperature of the frozen mass is augmented, and it begins to melt. The conductivity, or better, the carrying capacity of heat of liquids depends upon their mobility and consequent close contact with the objects subjected to their action, therefore, a stiffened or solid mass is incapable of doing the work properly.

That the conductivity of a liquid depends upon its mobility will be apparent from the following: It is one of the fundamental laws of physics, that variation in temperatures of liquids always causes currents in such liquids, and the greater the variation in temperature, the more rapid must be the involved currents, and the volatility of liquids is relative; they are all volatile at certain temperatures, and the same law covers them all. Anything, therefore, which impairs the free circulation of the currents in the liquid above referred to, as for instance, thickening the congelation of the liquid, of course, impairs its volatility and consequent conductivity. In other words, anything which retards the mobility of the liquid also retards its volatility. Furthermore, to illustrate that which is above stated relative to the solid or partially congealed liquid being unable to closely envelop or touch the vessels holding the water to be frozen, or the conducting medium, as the case may be—assume a can, filled with melted lard. As the lard cools and becomes solid, it is a well-known fact that the congealed contents of the can shrink away from it, leaving an annular space all about the cake of lard within it. Therefore there is no close contact between the lard and the sides of the vessel. Consequently the heat conveying capacity of the lard, relative to the can is seriously impaired, when the lard is congealed. This is precisely the action of the volatile liquids ordinarily employed for refrigerating purposes, because that which occurs in the case of lard, occurs in the case of all non-crystallizing liquids, and these are the ones now under consideration. It is only the liquids that crystallize while congealing that occupy a larger space when solid, than they do in liquid state. All others shrink.

It is desirable to obtain as rapid action as possible in refrigerating plants, especially those adapted to the manufacture of ice, in order that the temperature produced may be as low as possible. The difference in temperature between the evaporating vessel and that of the tank or vessel containing the conveying medium determines the rapidity of the circulation of said medium and consequent velocity of the transference of caloric, hence any means that makes it possible to lower the congealing point of the volatile liquid used adds to the effectiveness of the apparatus.

To prevent the thickening or congelation of the volatile liquid, I mix it with oils or other liquids or fluids of as nearly as may be the same specific gravity as itself, being perfectly miscible therewith. (If water is used directly as a condensing medium, or as a seal against atmospheric contact, it is of course necessary that the mixed liquids should be insoluble in water.)

The liquids which I employ for the purpose of preventing congelation and for regulating the rapidity of evaporation may be volatile or non-volatile, all that is essential is that the same should have the property to so intimately mix, (without, however, combining chemically) as to prevent the crystallization the one of the other, and to secure this result, it is preferred to use liquids having different temperatures of congelation, but as near as may be equal specific gravity, and of the greatest possible mobility in order to promote the best possible contact with the objects to be cooled. To effect, however, the regulation of the rapidity of evaporation only, of the volatile liquid, without regard to the lowering of the congealing point, the liquid so employed should be one of lower degree of mobility; in all cases, however, it is essential that the liquids used should be perfectly miscible with the volatile liquid.

To more particularly explain the use of the mixture of liquids or fluids in operating an ice making plant, I will now proceed to describe the mode of procedure, the object of the mixture being to retard the congelation of the evaporating liquid, in this case carbon bi-sulphide ($CS_2$). To this end chloroform is added to the carbon bi-sulphide to the proportion of nine parts of the sulphide to one of chloroform ($BHCL_3$) and the mixture so obtained is exposed in evaporating vessels to a vacuum more or less perfect, or to a rapid current of air. The vapors are condensed in suitable condensing apparatus re-conveyed to the evaporating vessels and again subjected to the vacuum. To regulate the rapidity of evaporation or to retard the same as applied in a refrigeration plant where constant rather than low temperature is required, I mix the carbon bi-sulphide with phenil chloride in the proportion of nine of the bi-sulphide to one of the phenil chloride. These proportions may be varied as required by the work to be performed, as the modifications produced on the evaporating liquid by the added liquid is in the same proportion as the percentage of the added liquid.

I claim—

1. The within described refrigerating liquid or mixture, composed essentially of a volatile liquid mixed with other liquids miscible with the volatile liquid, but not a solvent thereof substantially as set forth.

2. The within described refrigerating liquid or mixture, composed essentially of a volatile liquid, mixed with other liquid having a different degree of mobility than the volatile liquid and miscible therewith, but not a solvent thereof substantially as set forth.

Signed at Yorktown, in the county of Delaware and State of Indiana, this 22d day of March, A. D. 1893.

MARTIN WANNER.

Witnesses:
CLARENCE KILGORE,
JACOB W. CRAWFORD.